(12) United States Patent
Schreiber et al.

(10) Patent No.: US 11,144,192 B2
(45) Date of Patent: Oct. 12, 2021

(54) CUSTOMIZABLE USER INTERFACE FOR USE WITH DIGITAL INK

(71) Applicant: MICROSOFT TECHNOLOGY LICENSING, LLC, Redmond, WA (US)

(72) Inventors: Patrick Edgar Schreiber, Sammamish, WA (US); Heather Strong Eden, Bellevue, WA (US); Elise Leigh Livingston, Seattle, WA (US); Rachel Ann Keirouz, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/226,619

(22) Filed: Dec. 19, 2018

(65) Prior Publication Data
US 2020/0201533 A1   Jun. 25, 2020

(51) Int. Cl.
*G06F 3/0488* (2013.01)
*G06F 40/174* (2020.01)

(52) U.S. Cl.
CPC ........ *G06F 3/04883* (2013.01); *G06F 40/174* (2020.01)

(58) Field of Classification Search
CPC .............. G06F 3/04883; G06F 40/171; G06F 3/03545; G06F 3/0488; G06F 40/103; G06F 40/166; G06F 3/0484
See application file for complete search history.

(56) References Cited

U.S. PATENT DOCUMENTS

| | | | |
|---|---|---|---|
| 6,897,851 B2 * | 5/2005 | Carini | G06F 3/0481 345/173 |
| 7,692,636 B2 | 4/2010 | Kim et al. | |
| 8,064,702 B2 | 11/2011 | Markiewicz et al. | |
| 8,116,570 B2 | 2/2012 | Vukosavljevic et al. | |
| 2005/0135678 A1 | 6/2005 | Wecker et al. | |
| 2006/0159345 A1 * | 7/2006 | Clary | G06K 9/2063 382/186 |
| 2007/0005670 A1 * | 1/2007 | Pennington, II | G06F 3/04883 708/160 |
| 2008/0235577 A1 * | 9/2008 | Veluchamy | G06F 21/6209 715/268 |
| 2008/0260240 A1 | 10/2008 | Vukosavljevic et al. | |

(Continued)

FOREIGN PATENT DOCUMENTS

EP   2767894 A1   8/2014

OTHER PUBLICATIONS

"Non Final Office Action Issued in U.S. Appl. No. 16/226,601", dated Jan. 15, 2020, 11 Pages.

(Continued)

*Primary Examiner* — Sang H Kim
(74) *Attorney, Agent, or Firm* — NovoTechIP International PLLC

(57) ABSTRACT

A method of and system for providing and processing a customizable document that is responsive to digital ink input is carried out by displaying the customizable document on a screen, receiving input into an object in the document, modify the object and/or the input in response to the input, and displaying the modified object or input on the screen, where the modification is done based on the type of object and an examination of the input, and the input includes at least some digital ink.

16 Claims, 10 Drawing Sheets

(56) References Cited

U.S. PATENT DOCUMENTS

| | | | |
|---|---|---|---|
| 2009/0161959 A1* | 6/2009 | Markiewicz | G06K 9/222 |
| | | | 382/187 |
| 2011/0060985 A1* | 3/2011 | Kerr | G06F 3/04812 |
| | | | 715/702 |
| 2014/0006920 A1* | 1/2014 | Li | G06F 3/04883 |
| | | | 715/230 |
| 2014/0337804 A1* | 11/2014 | Hwang | G06F 3/04883 |
| | | | 715/863 |
| 2014/0344662 A1 | 11/2014 | Isabel et al. | |
| 2016/0179364 A1 | 6/2016 | Nicholson et al. | |
| 2016/0180160 A1 | 6/2016 | Vanblon et al. | |
| 2017/0199660 A1 | 7/2017 | Guiavarc'h et al. | |
| 2017/0315634 A1* | 11/2017 | Koyama | G06F 40/171 |
| 2018/0004406 A1* | 1/2018 | Jung | G06F 3/04883 |
| 2018/0089412 A1 | 3/2018 | Kopikare et al. | |
| 2020/0201532 A1 | 6/2020 | Livingston et al. | |

OTHER PUBLICATIONS

"International Search Report and Written Opinion Issued in PCT Application No. PCT/US2019/065570", dated Mar. 26, 2020, 14 Pages.

Vilar, et al., "A Flexible System for Document Processing and Text Transcription", In Proceedings of 13th Conference on Spanish Association for Artificial Intelligence, Nov. 9, 2009, pp. 291-300.

"International Search Report and Written Opinion issued in PCT Application No. PCT/US19/065569", dated Mar. 11, 2020, 13 Pages.

* cited by examiner

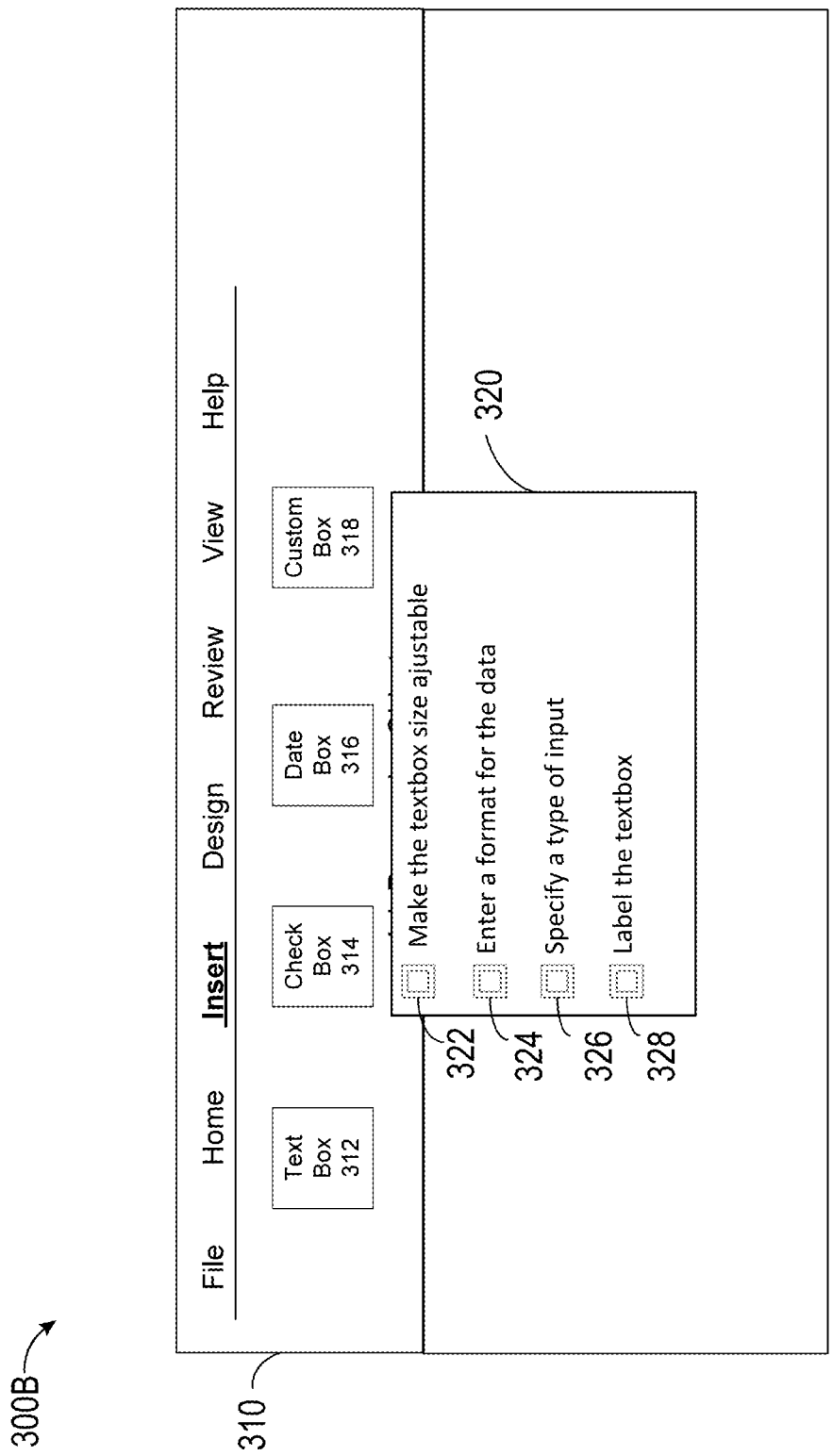

CUSTOMIZABLE USER INTERFACE FOR USE WITH DIGITAL INK

TECHNICAL FIELD

This disclosure relates generally to providing a customizable user interface for use with digital ink and, more particularly, to an improved method of and system for providing customizable documents that are responsive to digital ink input.

BACKGROUND

Traditionally, many businesses provide paper forms for their clients (e.g., patients) to fill out to receive some information that might be helpful in providing services to the client and could help establish an account for them. These forms are then generally inputted, often manually, into a database to create a digital record for the client. This could be a time consuming, cumbersome, and error-prone process, as it may require a second person to read the handwriting of the person filling out the form and correctly identifying the writing and properly typing it into the system. Some optical recognition applications have been developed that may be able to review and identify characters on paper forms. However, this may still require a person to scan the paper forms to turn them into digital format and then review the recognized text to ensure the application correctly identified the hand-written characters.

To avoid this, some businesses have started requesting that their client fill out and submit forms electronically for example, using a web portal. This, however, often requires a user to establish an online account, which may be inconvenient and time consuming for the clients. Furthermore, it often requires that the client remember and take the time to fill out their forms prior to receiving service (e.g., prior to arriving at the business), which takes up more time than some clients may be willing to allocate to the task. This means that many clients would still need to fill out their forms in paper form at the business.

Hence, there is a need for improved systems and methods for providing and processing customizable documents that are responsive to digital ink input.

SUMMARY

In one general aspect, the instant application describes a device having one or more processors; and a memory in communication with the processors where the memory comprises executable instructions that, when executed by the processors, cause the device to perform functions of displaying a digital ink enabled document including one or more object s on a user interface screen, receiving a digital ink input for one of the objects in the digital ink enabled document, modifying the object or the digital ink input in response to the digital ink, and displaying the modified object or the digital ink input on the user interface screen, wherein modifying the object or the digital ink input is done based on the type of object and an examination of the digital ink input.

In yet another general aspect, the instant application describes a method for providing a customizable document, where the method includes the steps of displaying a digital ink enabled document including one or more objects on a user interface screen, receiving a digital ink input for one of the objects in the digital ink enabled document, modifying the object or the digital ink input in response to the digital ink input, and displaying the modified object or the digital ink input on the user interface screen, where the modifying is done based on the type of the one object and an examination of the digital ink input.

In a further general aspect, the instant application describes a non-transitory computer readable medium on which are stored instructions that when executed cause a programmable device to display a digital ink enabled document including one or more objects on a user interface screen, receive a digital ink input for one of the one or more objects in the digital ink enabled document, modify the object or the digital ink input in response to the digital ink input, and display the modified object or the digital ink input on the user interface screen, where the modifying is done based on the type of object and an examination of the digital ink input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 3A-3B depict example UI screens displaying a toolbar for inserting modular controllable objects into a document.

DETAILED DESCRIPTION

Figure 1:
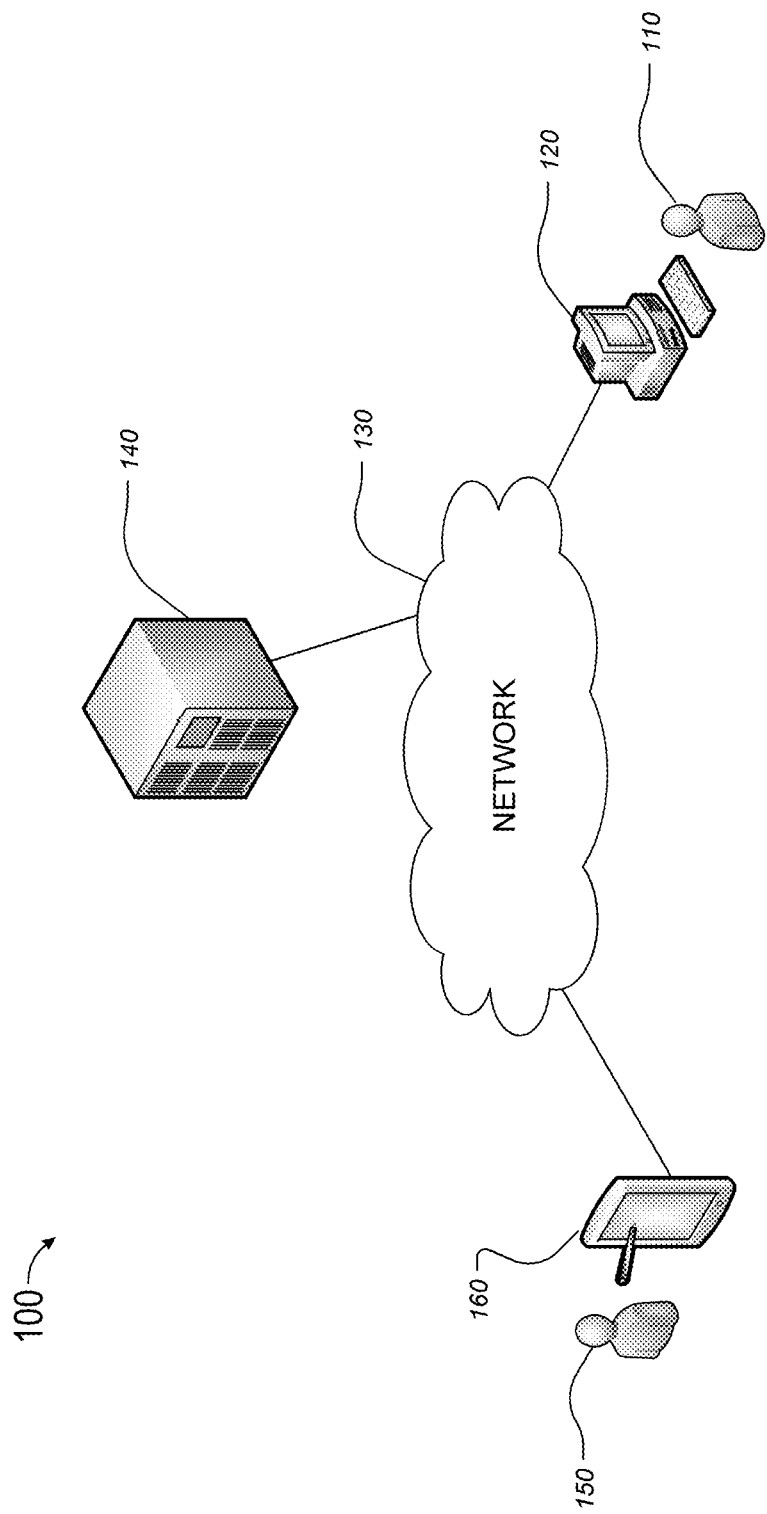
FIG. 1 depicts an example of a representative environment for providing and processing a customizable document that is responsive to digital ink input.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Traditionally most forms are only accessible on paper, and the data that is input in the forms has to be digitized later. This often means that someone has to review the form, transcribe it, and enter it into a computer database. Alternatively, the paper form may be scanned, in which case it may require a conversion to digital text, which may still make the entire process time-consuming and error-prone.

Furthermore, the process of filling out a form by hand, has its own limitations. For example, when filling out the form, people may make mistakes, which could mean they have to start over, or cross over the mistake. This may lead to running out of space. Moreover, the writer is physically limited by the paper size, which means that important information might have to be squeezed in, making the form harder to read.

To address these issues and more, in an example, this description provides an improved method and system of providing and processing customizable documents that are responsive to digital ink input. To improve the current methods of filling out forms, the technical solution enables insertion of modular individually controllable objects into a variety of documents by using an easy to use interface. The modular objects may be customizable and responsive to digital ink such that depending on the digital ink inserted into the objects, the object may change. For example, a textbox may expand to accommodate more text, when the method recognizes that the user is running out of space in the textbox. The controls may also enable ink recognition and conversion such that, for example, ink in textboxes could be converted to text or checkboxes could be converted to a digital checkbox when one is checked. This could allow the person using digital ink to check the converted text to ensure accuracy. It would also enable the owner of the document to store the data more accurately and efficiently. Controls may also be provided that would allow the creator of the document to label the objects such that the document could be parsed more easily when being processed. As a result, the solution provides a customizable use-friendly user interface for entering text into a document in an efficient and accurate way which is convenient to both the user and the owner/creator of the document.

As will be understood by persons of skill in the art upon reading this disclosure, benefits and advantages provided by such implementations can include, but are not limited to, a solution to the technical problems of having an inefficient, labor intensive and unreliable process of filling out forms. Technical solutions and implementations provided here optimize and improve the process of entering data into a form by enabling use of digital ink to enter data and by providing customizable objects in the form that are responsive to and change in response to digital ink. The benefits provided by these solutions include providing increased accuracy, reliability and efficiency in filling out documents by hand.

FIG. 1 illustrates an example system 100, upon which aspects of this disclosure may be implemented. The system 100 may include a user 110 operating a user device 120 which is connected through a network 130 to one or more other devices. The user 110 may be a person creating a document for use by one or more other users later. For example, the user 110 may be an administrator or other employee of a business creating a form to be filled out by one or more clients, employees, or contractors of the business. The user 110 may create the document using an application running on the user device 120. The document may then be stored locally on the user device 120 or may be transmitted via the network 130 to a server 140 for storage on a memory of the server 130. Alternatively, the document may be transmitted directly to one or more other devices connected to the network 130 which may be used to modify the document (e.g., used to enter data into the document).

The network 130 may be a wired or wireless network or a combination of wired and wireless networks. In one implementation, the server 140 may be configured to perform one or more steps of the methods disclosed herein. Alternatively, the one or more steps may be done by the device 120 and/or device 160 connected locally or remotely to the network 130. In another configurations, some of the steps may be performed by the server 140, and some may be performed by the device 120 and/or device 160. The device 160 may be operated by a user 150, who may be a client, an employee, or otherwise a person representing an entity that works with the business.

It should be noted that although only one additional user device 160 is shown in FIG. 1, the actual number of additional user devices in the system 100 may vary depending on the size and type of the organization. For example, the system 100 for a large company having multiple clients may include many more devices that can be used at the same time to enter data into different copies of the document. The multiple devices may be spread out in different geographical locations. The user device(s) 120 and 160 may include any stationary or mobile computing devices configured to provide a user interface for interaction with a user and configured to communicate via the network 130. For example, the user devices may include workstations, desktops, laptops, tablets, smart phones, cellular phones, personal data assistants (PDA), printers, scanners, telephone, or any other device that can be used to interact with a user. The user device 160 may be any device that can be used to enter digital ink. For example, the user device 160 may be a tablet configured to work with a stylus to receive digital ink.

It should be noted that although the system 100 is discussed as being a part of a business, it may be used in any enterprise or entity (e.g., an individual, a family or an enterprise) that could benefit from digitized data entry into one or more documents. Additionally, although the devices 130 and 160 are shown as being connected to the network 130, they could be disconnected and operate independently from a network environment. For example, the device 130 may be used to create a document which it can transfer directly (e.g., without the user of a network through a direct connection) to the user device 160. The modified documents may then be stored and processed locally on the user device 160. Furthermore, although devices 130 and 160 are shown as separate device, in one implementation, they may be combined into one device. For example, in smaller enterprises, the same device may be used to both create the document and enter data into the document.

In one implementation, once the user 150 enters data into the document via the device 160, the revised documents is transmitted via the network 130 to the server 140 for storage and/or processing. Alternatively, the revised document is transmitted to the device 120 for storage and/or processing.

Figure 2A:
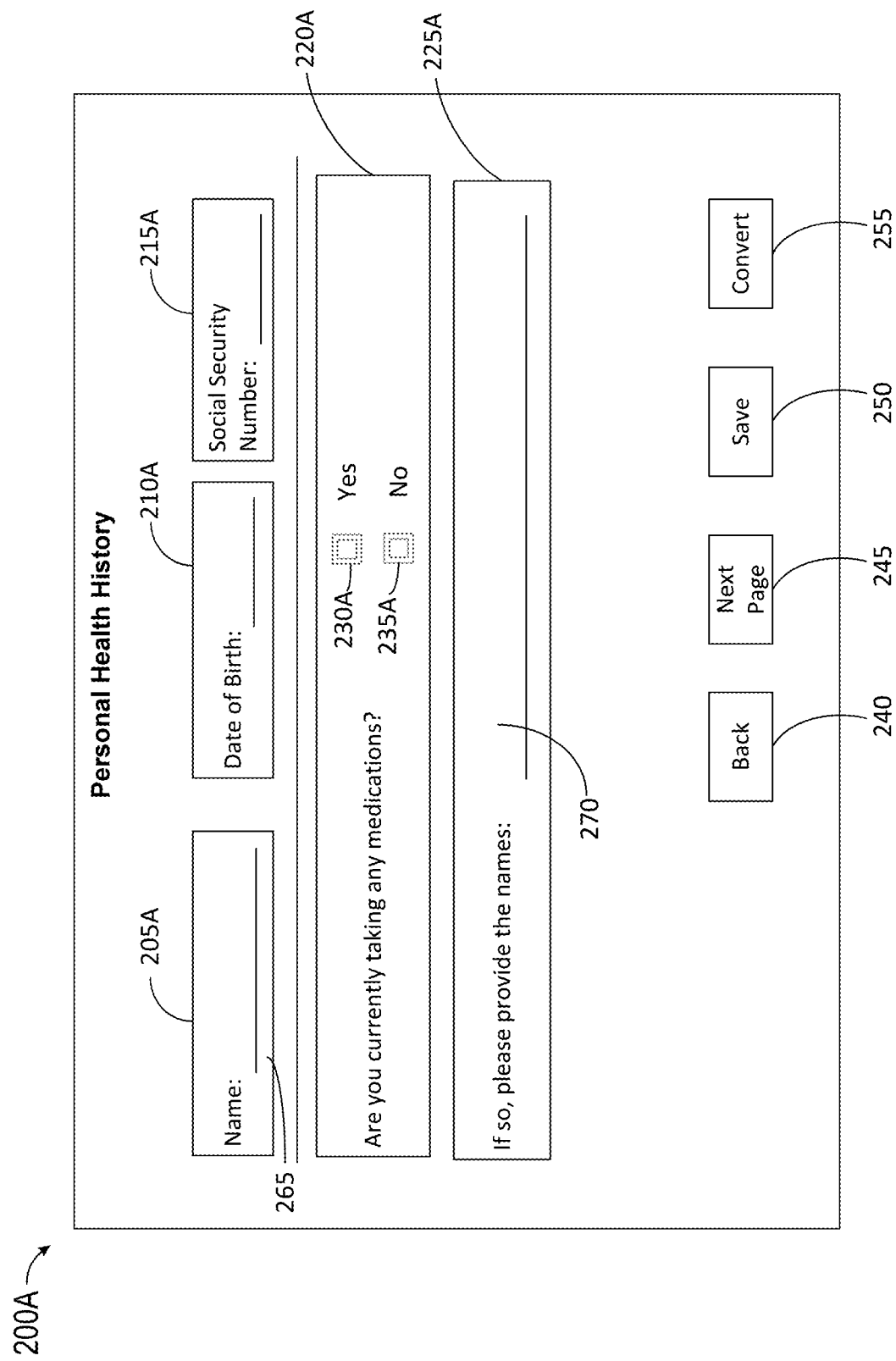
FIG. 2A-2C depict example user interface (UI) screens displaying a customizable document containing one or more controllable objects that are responsive to digital ink input.

FIG. 2A depicts an example UI screen 200A displaying a blank customizable document containing one or more controllable objects that are responsive to digital ink input. The screen 200 may include textboxes 205A, 210A, 215A and 225A, and a box 220 containing two checkboxes 230A and 235A. The textboxes 205A, 210A, 215A and 225A and checkboxes 230A and 235A may be configured to adapt to various types of input. For example, each textbox may be configured to receive keyboard text, digital ink, voice input, or any other type of input mode available via the device presenting the screen 200 or another device. Alternatively, each textbox may be configured to receive specific type(s) of input.

Figure 2B:
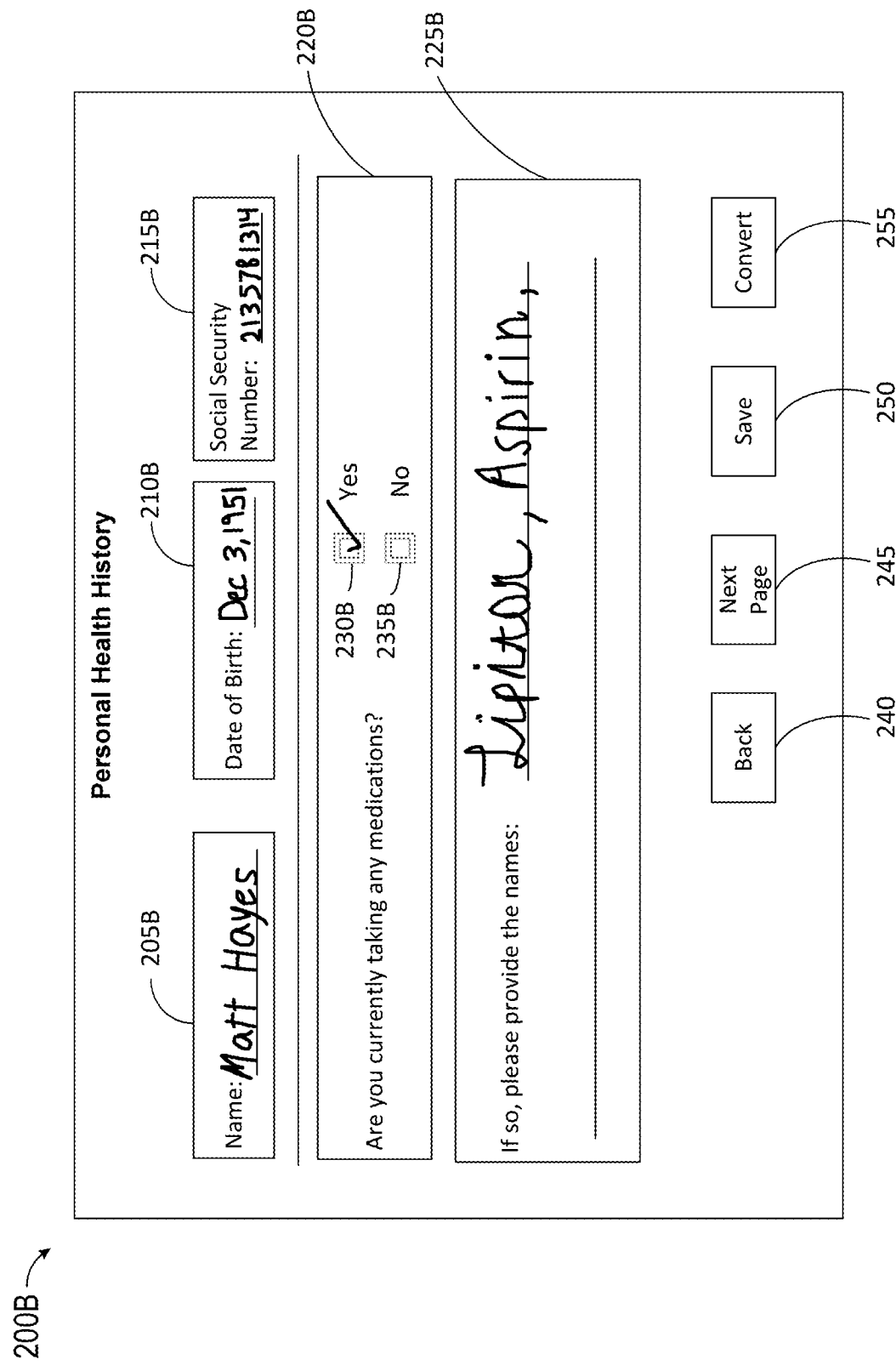

In one implementation, the customizable document is configured to respond dynamically to the type of input provided by for example changing the object accordingly to receive the proper type of input. This is illustrated in FIG. 2D which depicts how textboxes 205D and 225D may react differently to two different types of input. For example, as shown in textbox 205D, the pointer 265 may be displayed over an object when it is determined that the type of input received for the object (e.g., textbox 205D) will be entered via a keyboard and/or a mouse. A corresponding cursor 270 (e.g., vertical line) may be displayed in the textbox 205D once the user starts entering input into the textbox to show the location of the last character entered. Similarly, the digital pen 275 may be displayed and the textbox 225D may expand to allow for inking, when it is determined that the type of input selected for textbox 225D is digital ink. Thus, the text fields may respond dynamically to the type of input selected. Furthermore, when one or more objects of a document are configured to receive digital ink, the document displaying the objects may be linked with or may include digital ink recognition features.

In addition to being configured to receive different types of input, the objects in the document (e.g., textboxes) may also be configured to be responsive to the input. Referring back to FIG. 2A, for example, textbox 225A, which is intended to be used for a list of medications, may be configured to adapt its size in response to the size of the received input. For example, textbox 225 may be configured to automatically increase its size when the entered input reaches the end of the textbox. This is particularly useful for digital ink, as size and style of handwriting between different individuals varies widely. As a result, some may require much more space to write the same text than others. Furthermore, some people may have more information that they need to provide in response to a question. Modifying the size of the textbox enables users to have as much as space as required. In one example, modifying the size of the textbox may involve automatically adding a new line to the textbox once the user reaches the end of the first line. This is illustrated in FIG. 2B which depicts an example UI screen 200B for when data has been entered into textboxes of the screen 200A.

As can be seen in screen 200B, when the user reaches the end of the line, the size of textbox 225B is increased by adding an input line in the textbox 225B. This can be repeated as long as needed. In one implementation, when the user reaches the end of the page in the document, the textbox may be extended into the next page. Alternatively, the size of the current page may be increased by for example making the page scrollable. Each of the textboxes 205B, 210B, 215B and 225B may be adjustable in size based on user input. Alternatively, some may be adjustable in size, while others include other controllable properties. For example, textbox 210B may be configured specifically for dates. This could mean, for example, that if a user enters data that does not correspond with a date, an error message may be displayed on the screen 200B notifying the user that the wrong type of information was entered. This may be done by displaying a popup box and may also include automatically deleting the data entered in the textbox 210B.

The textbox 215B, on the other hand, may be customized for receiving a social security number. This may mean, for example, that if characters other than numbers or a dash are entered, an error message may be displayed on the screen 200B notifying the user that the wrong type of information was entered. This may also be done by displaying a popup box and may include automatically deleting the data recognized as the wrong type of data.

Checkboxes 230B and 235B may be configured for receiving a checkmark or any other type of input that may be indicative of a user selecting one of the boxes 230B and 235B. The type of input may be any handwriting indicia or stroke over a checkbox. For example, a user may decide to fill in the checkbox 230B instead of placing a checkmark. Another may decide to circle the checkbox 230. Yet another may simply put a dot in the checkbox. The checkboxes 230B and 235B may be configured to interpret any or all of these types of inputs as a checkmark.

Figure 2C:
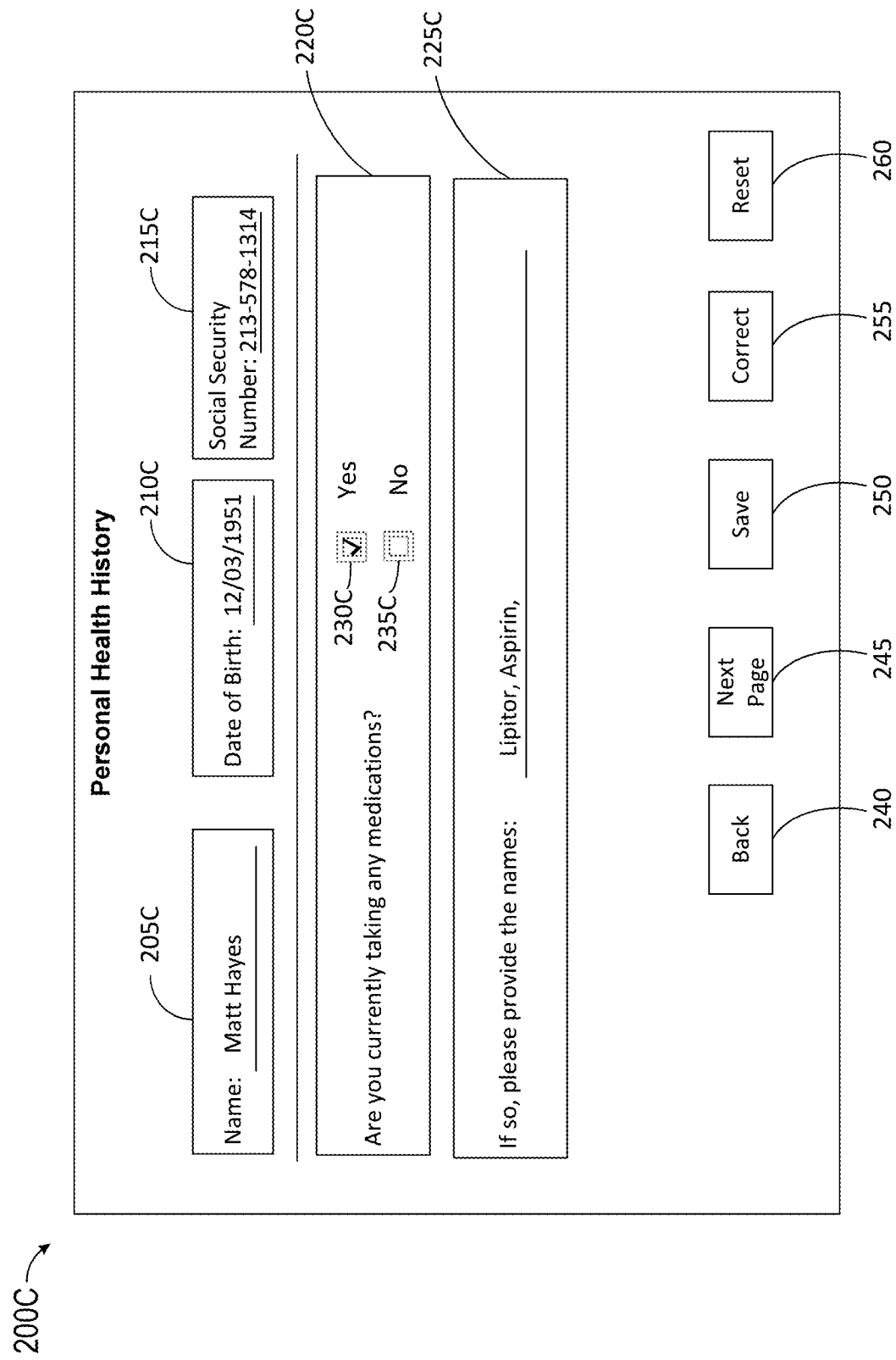
Figure 2D:
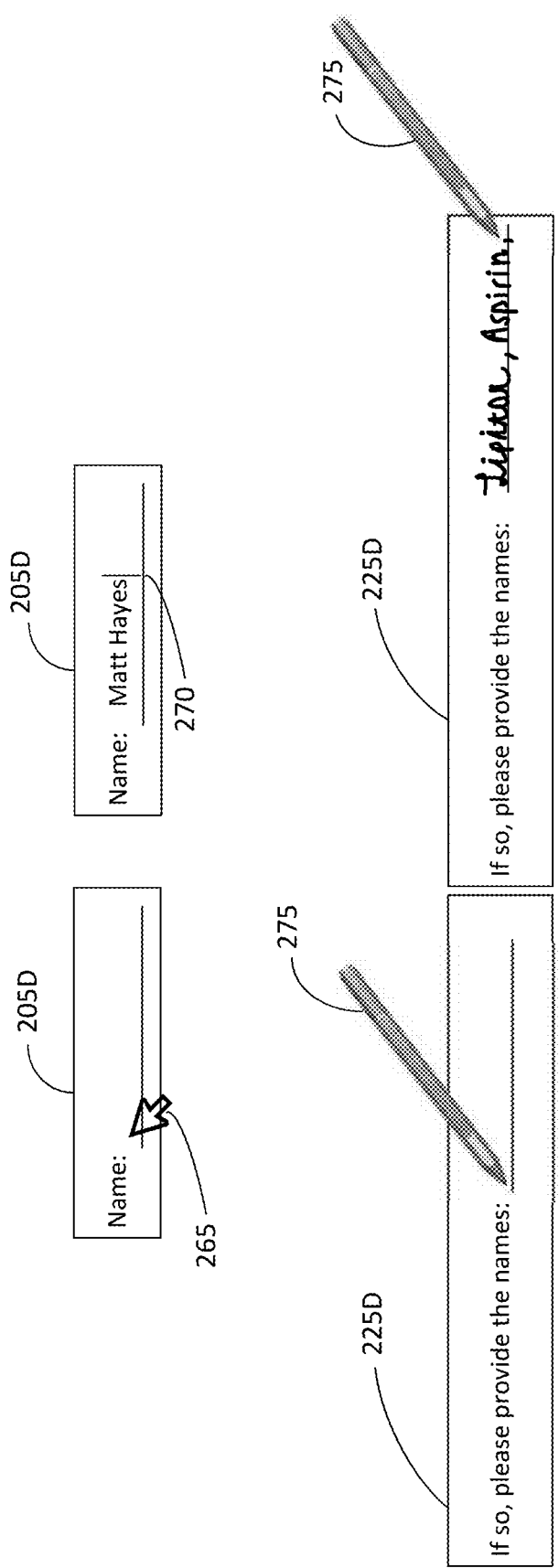
FIG. 2D depicts an example of how objects in a document may respond dynamically to different types of input.

FIGS. 2A-2C include a back button 240 for going back to a previous page of the document and a next page button 245 for going to the next page. In instances where there is no previous page or next page, these buttons may be automatically deactivated. Alternatively, inapplicable buttons may simply not be shown on the screen.

FIGS. 2A-2C may also include a save button 250 for saving the entered data and a convert button 255 for converting the entered data. Saving the data may include storing the data in a local memory of the device displaying the screen or may involve transmitting the document for storage in a network server or other device. In one implementation, as part of the saving process, any digital ink may be automatically converted. Furthermore, the convert button 255 may be used for converting the entered data. This may include converting any digital ink data entered into the document to typed text and may be performed by an ink recognition application. Conversion may also include converting one type of entered data to a standardized format. Although, only one convert button is shown, in one implementation, each different object may include its own convert button for when the user desires to see the converted version of a specific object. Pressing the convert button 255 on the screen 200B may cause the screen 200C of FIG. 2C to be displayed on the display device. In an alternative implementation, the screen may turn into a split screen that displays the screen 200B on one side and screen 200C on another side.

Referring now to FIG. 2C, an example screen 200C for converted input is depicted. Screen 200C includes a textbox 205C which displays the text for the digital ink entered into textbox 250B, and a textbox 210C which shows the date entered into textbox 210C as converted to a predetermined format. The predetermined format may be set by a creator of the document or may be a standard format. Converting a date entered into the textbox to a standard format may also the owner of the document to more easily review and/or parse the documents. Screen 200C also displays a textbox 215C which shows the numbers entered into the textbox 2158 converted into a predetermined format. For textbox 215C, the format is a standard format used for social security numbers. Other types of customizations may also be made.

Screen 200C also includes a text block 220C for displaying the two checkboxes 230C and 235C. The checkbox 230C is shown as having been checked, since the checkbox 230 included a mark on the checkbox. In this manner, any indication for marking a checkbox can be converted to a standard checkmark. Furthermore, textbox 225C is shown has converted the digital ink entered into textbox 2258 to typed text. Moreover, since the typed text occupies a lot less space than the handwriting version, the size of the textbox 225C has been reduced back to its original size.

In addition to the buttons 240, 245, and 250, screen 200C which contains converted data may also include a correct button 255 and a reset button 260. The correct button 255 may be used to correct one or more of the converted texts. In one implementation, once the correct button 255 is pressed, the user has the option of selecting the text that needs to be corrected and correcting the mistake in one or more manners known in the art. The reset button 260 may be used when the user determines that it may be easier and/or more efficient to reenter the entire text than to correct all of the mistakes.

In this manner, the example UI screen provides easy to use modular controllable objects that are responsive to input and can be utilized as desired to receive, covert, review, correct and organize data.

Figure 3A:
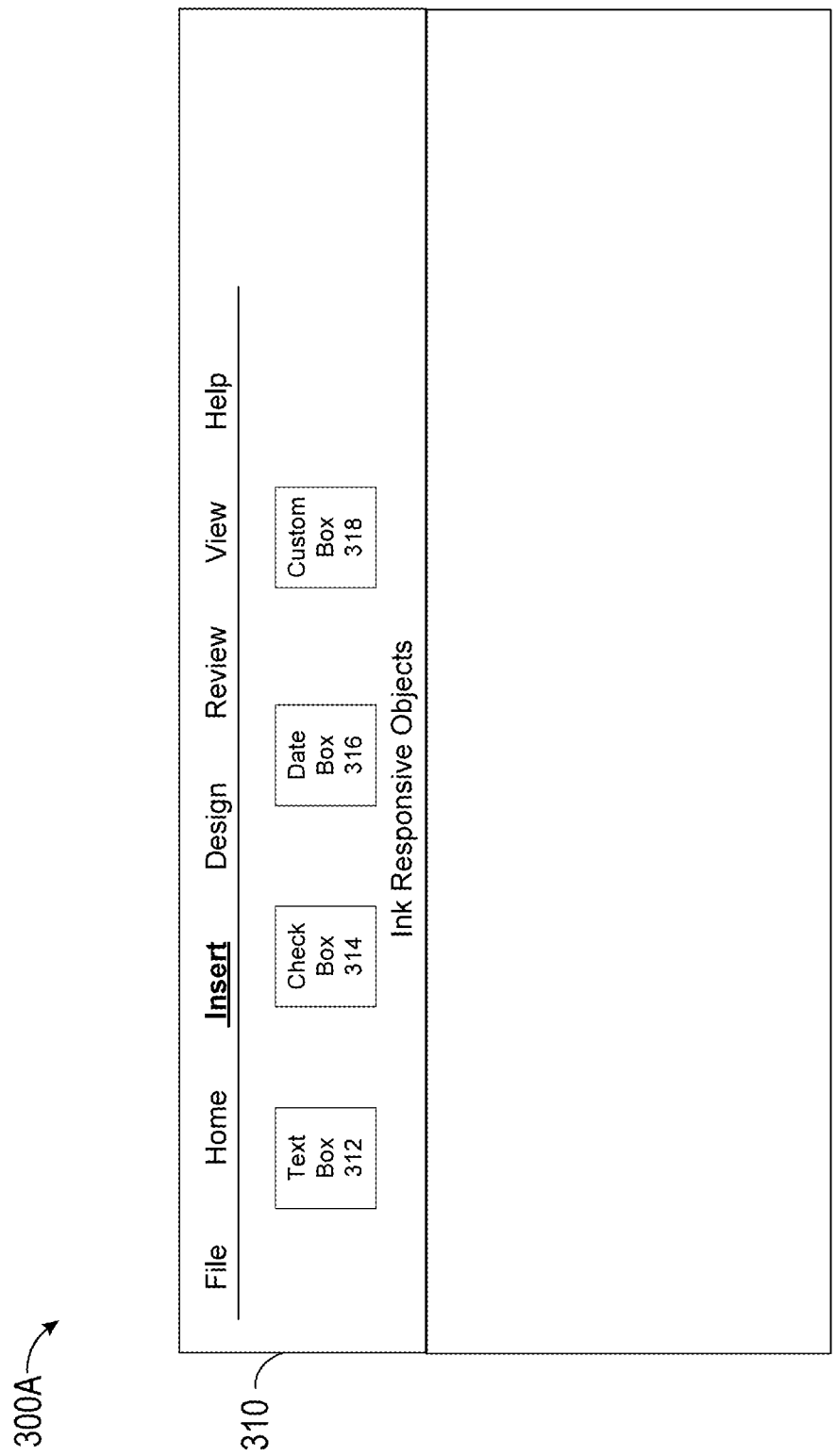

FIG. 3A depicts an example user interface 300A displaying a toolbar for inserting modular controllable objects into a document. In one implementation, upon selecting an insert tab, one or more icons for inserting ink responsive objects into the document are displayed. These icons may include an icon for a textbox 312, checkbox 314, date box 316 and custom box 318. The textbox icon 312 may insert an ink responsive textbox into the document. This may mean that the textbox is enabled to receive, interpret and convert digital ink. Similarly, a checkbox inserted by selecting the checkbox icon 314 may be enabled to receive and in, interpret and convert any digital ink indicative of a checkbox being marked.

The date box icon 316 may insert a text box configured to receive and convert digital ink in the form of a date. The custom box icon 318 may be used to insert a customized textbox for example for selecting a format to convert the entered text to. The toolbar may include other icons for insert different types of objects. For example, an icon for inserting a signature box may be included. In one implementation, upon selection of one or more of the icons, another menu may be displayed to present the user with more options for customizing the inserted object. For example, upon pressing the textbox icon 312, the screen 300B of FIG. 3B may be displayed.

FIG. 3B includes a popup box 320 for presenting options to select from for the textbox being insert. For example, the popup box 320 may include an option 322 for choosing to make the size of the textbox adjustable based on input, an option 324 for entering a format for the entered data to either choose the format of the data that can be entered and/or covert the entered data to the selected format. The popup box 320 may also provide an option 326 for allowing the user to specify a type of input for the data. For example, the user may be able to choose only digital ink, or typed text and or any other type of input desired. Furthermore, the options may include an option 328 for labeling the textbox. The label could be any label the creator desires and may be used later to parse and/or obtain information from the document. For example, a business may desire to keep track of the age range of its clients to better market itself. Such a business may label the textbox for provided for entering the date of birth. Once a desired number of documents have been collected from clients, the business may utilize an application to pull the date of birth information from the all the data collected from the forms for further analysis. Many other options may be presented as part of the popup box 320 or any other ways of providing the user with options to customize the inserted objects.

Figure 4:
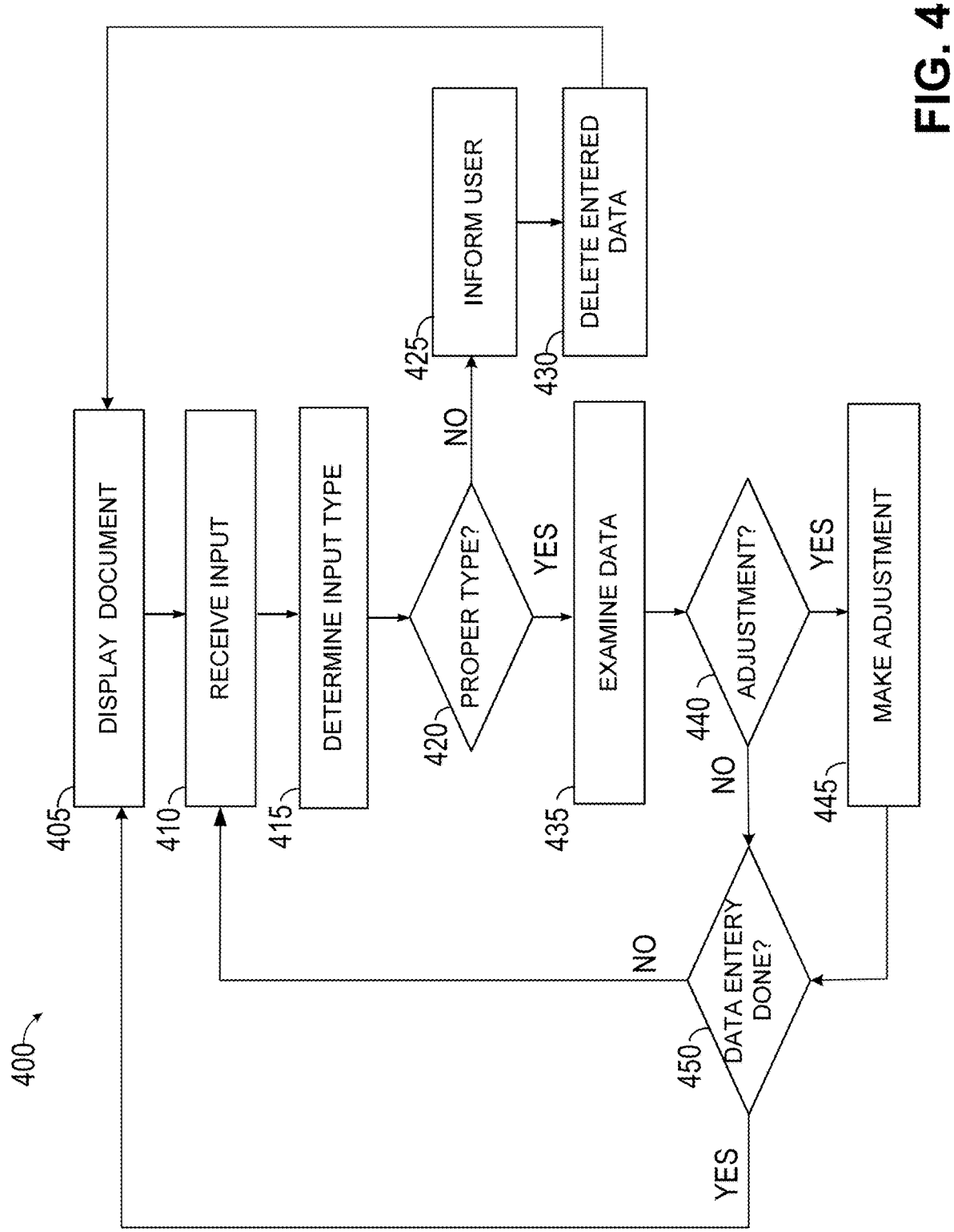
FIG. 4 is a flow diagram showing an example method 400 providing and processing a customizable document that is responsive to digital ink input.

FIG. 4 is a flow diagram depicting an example method 400 for providing and processing a customizable document that is responsive to digital ink input. At 405, the method 400 begins by displaying a document containing one or more controllable objects. This may be initiated by for example, opening the document on a user device. Once the document is displayed, method 400 waits until it receives an input from a user for one of the objects (e.g., a textbox, checkbox, signature box, etc.) in the document, at 410. The method can receive input from a variety of sources and many different types. For example, the input may be received directly from the device displaying the document via for example a user interface device (e.g., a keyboard or a microphone of the device for typed text or voice input) or it may be received from a screen of the device (e.g., a tablet screen using an onscreen keyboard or a hand gesture on the screen for digital ink). The input may also be received indirectly via a separate device for example a mobile device connected via a network to the device or for handwriting through the use of another device such as a light pen, a stylus or a mouse that enables handwriting to be made to a screen without necessarily requiring a user to handwrite over that screen. To determine which object the input is intended for, method 400 may utilize techniques such as determining the location of a curser in the document or utilizing pressure and location sensors, among others.

Once method 400 determines that input has been received for an object in the document, the method proceeds to determine if the type of input received is appropriate for the object, at 415. This may be done for objects that have been customized to receive specific types of input or when the document as whole has been customized to receive a specific type of input. For instances where the object or the entire document can receive various types of input, steps 415-430 may be eliminated. Once the type of data input into the object is determined, method 400 proceeds to determine, at 420, if the type of data is appropriate for the object. When it is determined that the type of data is not correct, method 500 may proceed to inform the user, at 425. This may be done via displaying an error message, for example. In one implementation, after informing the user, method 400 proceeds to delete the incorrect type of data entered into the object, at 430, before returning back to step 405 to display the document and wait for more input.

When it is determined that the type of data is correct, method 400 proceeds to examine the entered data, at 435. Based on the examined data, method 400 then determines if any adjustments to the object or the entered data are needed, at 440. For example, method 400 may monitor the entered data to determine if it has reached the end of a textbox to determine if the size of the textbox should be increased to provide more space. Alternatively, method 400 may monitor the data to see if the format of the entered data is correct and if not automatically change the format to the correct predetermined format. When it is determined that an adjustment to the object or the entered data is needed, method 400 proceeds to make the adjustment, at 445. When it is determined that an adjustment is not needed at 440 or after the adjustment is made at 445, method 400 proceeds to determine if data entry for that object is done, at 450. This may be done for example, by monitoring the cursor to see if it is moved to a new object and/or by examining the passage of time. For example, when a predetermined amount of time has passed after the last indication of input was received, method 400 may determined that data entry for that object is done for the time being.

In one implementation, when digital ink interacts with the objects in the document, they become more pen optimized. For example, they may store information about the type of input received and use that to optimize the document. This may mean, for example, that if a textbox needs to be expanded a majority of the time, the application running the document may automatically expand the textbox for future forms.

When it is determined that data entry is done, method 400 may return to step 405 to display the document and wait for the next input, which could for example be for another object in the document. When it is determined, however, that data entry is not yet finished, method 400 may return back to step 410 to receive the input being received and continue on as discussed above.

In this manner, methods are presented for providing and processing an improved user interface for receiving and responding to digital ink input. The improved user interface may be used for displaying ink enabled forms that allow users to fill out forms using ink with an experience that is better than paper. The ink enabled forms may examine and respond to the ink that is input in the forms. The method includes an ability to insert modular objects (textboxes, signature boxes, checkboxes) into a variety of document types via an easy-to-use interface. Once digital ink has been inputted, methods used may provide the ability to perform ink recognition after the form has been entirely filled out by the user rather than converting text throughout the writing process, and in a manner that maintains the previous versions of the form with ink.

Figure 5:
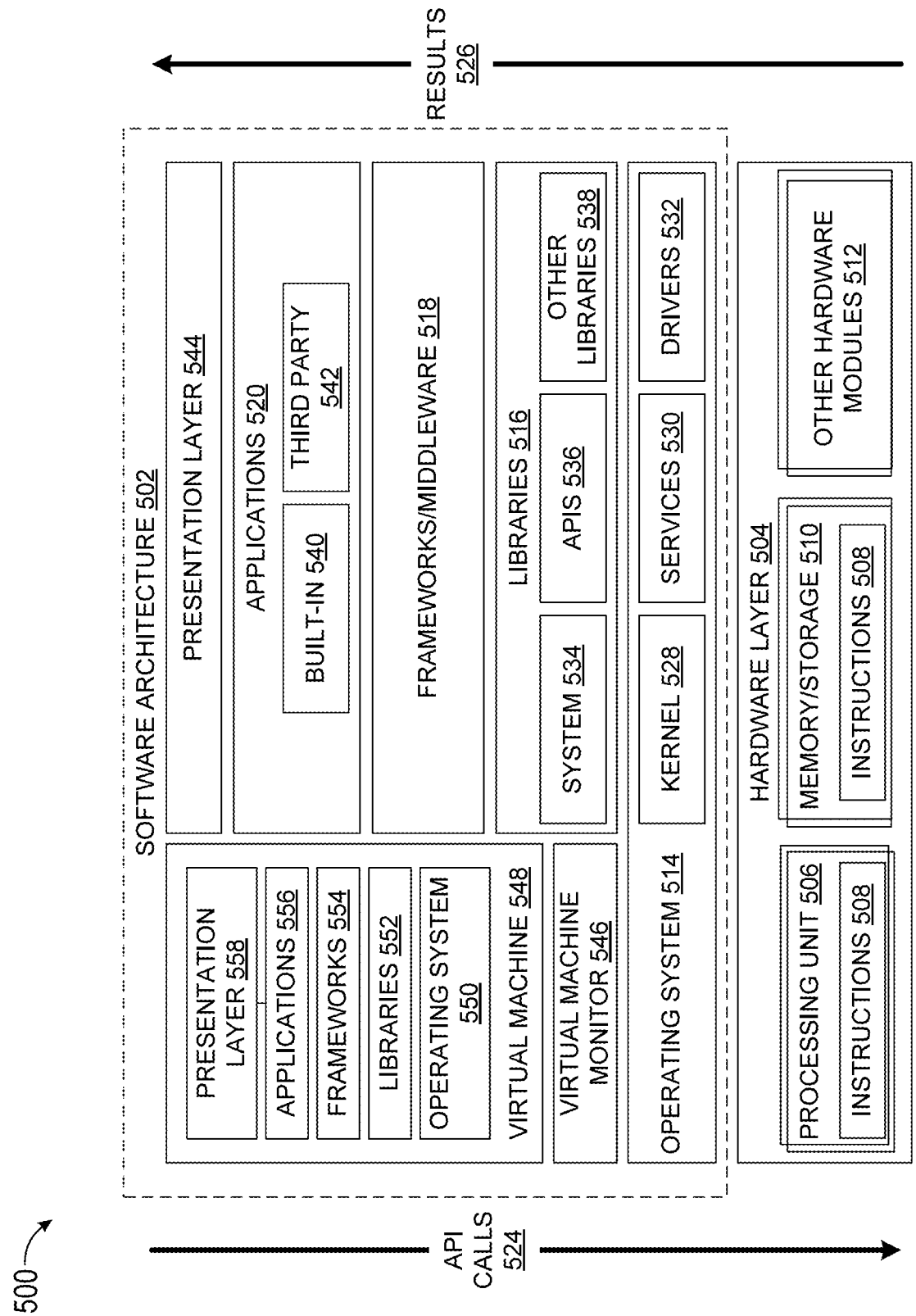
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 508 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 524. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 520 and/or third-party applications 522. Examples of built-in applications 520 may include, but are not limited to, a contacts application, a browser application, a location application, a media application, a messaging application, and/or a game application. Third-party applications 522 may include any applications developed by an entity other than the vendor of the particular system. The applications 520 may use functions available via OS 514, libraries 516, frameworks 518, and presentation layer 524 to create user interfaces to interact with users.

Some software architectures use virtual machines, as illustrated by a virtual machine 528. The virtual machine 528 provides an execution environment where applications/modules can execute as if they were executing on a hardware machine (such as the machine 600 of FIG. 6, for example). The virtual machine 528 may be hosted by a host OS (for example, OS 514) or hypervisor, and may have a virtual machine monitor 526 which manages operation of the virtual machine 528 and interoperation with the host operating system. A software architecture, which may be different from software architecture 502 outside of the virtual machine, executes within the virtual machine 528 such as an OS 550, libraries 552, frameworks 554, applications 556, and/or a presentation layer 558.

Figure 6:
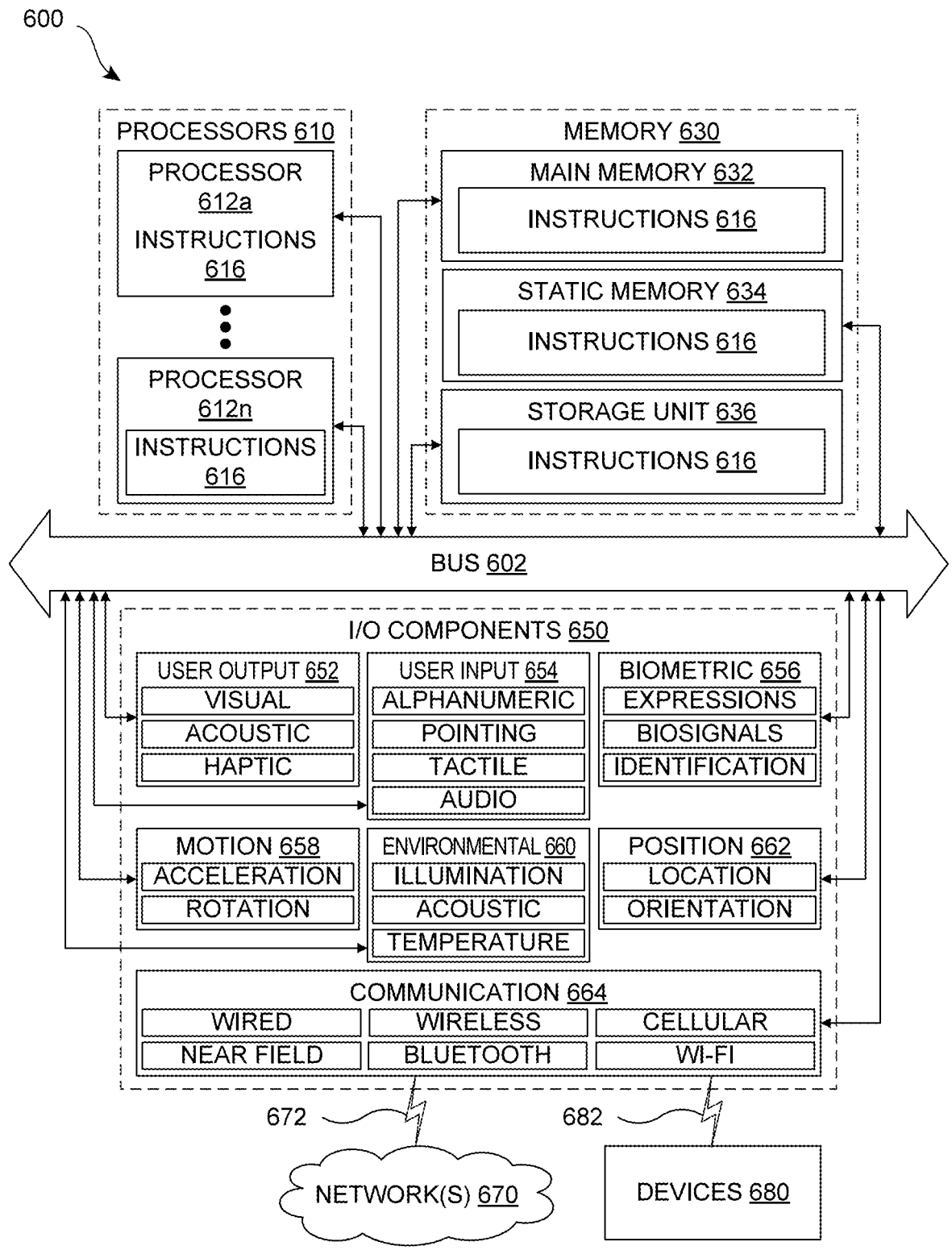
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" include a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
one or more processors; and
a memory in communication with the one or more processors, the memory comprising executable instructions that, when executed by the one or more processors, cause the device to perform functions of:
inserting one or more objects into a digital ink enabled document;
upon inserting the one or more objects into the digital ink enabled document, selecting a type of input for at least one of the one or more objects; and
labeling at least one of the one or more objects to enable parsing the document;
displaying the digital ink enabled document including the one or more objects on a user interface screen;
receiving a digital ink input for one of the one or more objects in the digital ink enabled document;
dynamically modifying the one of the one or more objects and the digital ink input in response to the digital ink input; and
displaying the modified one of the one or more objects and the modified digital ink input on the user interface screen;
wherein:
the one or more objects are controllable form objects that are insertable into the digital ink enabled document for receiving digital ink input,
dynamically modifying the one of the one or more objects comprises:
examining the received digital ink input,
examining the one of the one or more objects to determine a type of the one of the one or more objects,
determining, in response to the received digital ink input, whether the one of the one or more objects should be modified, and
dynamically modifying the digital ink input comprises:
converting the digital ink input to typed text, and
changing a format of the typed text based on the type of the one of the one or more objects.

2. The device of claim 1, wherein the executable instructions when executed by the one or more processors further cause the device to perform functions of converting the digital ink input to text characters after making a determination that all desired one or more objects in the digital ink enabled document have received digital ink input.

3. The device of claim 2, wherein the executable instructions when executed by the one or more processors further cause the device to perform functions of:
creating a copy of the digital ink enabled document in which the one or more objects display the text characters; and
preserving the digital ink enabled document in which the one or more objects display the received digital ink input.

4. The device of claim 1, wherein the one of the one or more objects includes at least one of a textbox, checkbox or signature box.

5. The device of claim 4, wherein modifying the textbox comprises changing a size of the textbox in response to the digital ink input.

6. The device of claim 4, wherein modifying the checkbox comprises checking the checkbox when the received digital ink input indicates a checkmark was drawn on the checkbox.

7. A method for providing a customizable digital ink enabled document comprising:
inserting one or more objects into the digital ink enabled document;
upon inserting the one or more objects into the digital ink enabled document, selecting a type of input for at least one of the one or more objects; and
labeling at least one of the one or more objects to enable parsing the digital ink enabled document;
displaying the digital ink enabled document including the one or more objects on a user interface screen;
receiving a digital ink input for one of the one or more objects in the digital ink enabled document;
dynamically modifying the one of the one or more objects and the digital ink input in response to the digital ink input; and
displaying the modified one of the one or more objects and the modified digital ink input on the user interface screen;
wherein:
the one or more objects are controllable form objects that are insertable into the digital ink enabled document for receiving digital ink input,
dynamically modifying the one of the one or more objects comprises:
examining the received digital ink input,
examining the one of the one or more objects to determine a type of
the one of the one or more objects,
determining, in response to the received digital ink input, whether the one of the one or more objects should be modified, and
dynamically modifying the digital ink input comprises:
converting the digital ink input to typed text, and
changing a format of the typed text based on the type of the one of the one or more objects.

8. The method of claim 7, further comprising:
converting the digital ink input to text characters after making a determination that all desired one or more objects in the digital ink enabled document have received digital ink input;
creating a copy of the digital ink enabled document in which the desired one or more objects display the text characters; and
preserving the digital ink enabled document in which the one or more objects display the received digital ink input.

9. The method of claim 7, wherein the one of the one or more objects includes at least one of a textbox, checkbox or signature box.

10. The method of claim 9, wherein modifying the textbox comprises changing a size of the textbox in response to the digital ink input.

11. The method of claim 9, wherein modifying the checkbox comprises checking the checkbox when the received input indicates a checkmark was drawn on the checkbox.

12. A non-transitory computer readable medium on which are stored instructions that when executed cause a programmable device to:
insert one or more objects into a digital ink enabled document;
upon inserting the one or more objects into the digital ink enabled document, select a type of input for at least one of the one or more objects;

label at least one of the one or more objects to enable parsing the document;
display a digital ink enabled document including one or more objects on a user interface screen;
receive a digital ink input for one of the one or more objects in the digital ink enabled document;
dynamically modify the one of the one or more objects and the digital ink input in response to the digital ink input; and
display the modified object and the modified digital ink input on the user interface screen;
wherein:
the one or more objects are controllable form objects that are insertable into the digital ink enabled document for receiving digital ink input,
dynamically modifying the one of the one or more objects comprises:
examining the received digital ink input,
examining the one of the one or more objects to determine a type of the one of the one or more objects, and
determining, in response to the received digital ink input, whether the one of the one or more objects should be modified, and
dynamically modifying the digital ink input comprises:
converting the digital ink input to typed text, and
changing a format of the typed text based on the type of the one of the one or more objects.

13. The non-transitory computer readable medium of claim 12, wherein the instructions further cause the programmable device to:
convert the digital ink input to text characters after making a determination that all desired one or more objects in the digital ink enabled document have received digital ink input;
create a copy of the digital ink enabled document in which the desired one or more objects display the text characters; and
preserve the digital ink enabled document in which one or more objects display the received digital ink input.

14. The non-transitory computer readable medium of claim 12, wherein the one of the one or more objects includes at least one of a textbox, checkbox or signature box.

15. The non-transitory computer readable medium of claim 14, wherein modifying the textbox comprises changing a size of the textbox in response to the digital ink input.

16. The non-transitory computer readable medium of claim 14, wherein modifying the checkbox comprises checking the checkbox when the received input indicates a checkmark was drawn on the checkbox.

* * * * *